US011245265B2

(12) United States Patent
Brombach et al.

(10) Patent No.: US 11,245,265 B2
(45) Date of Patent: Feb. 8, 2022

(54) METHOD FOR OPERATING A WIND FARM (71) Applicant: Wobben Properties GmbH, Aurich (DE)

(72) Inventors: Johannes Brombach, Berlin (DE); Katharina Schubert, Aurich (DE); Helge Giertz, Leer (DE); David Rogge, Hesel (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/474,517

(22) PCT Filed: Dec. 27, 2017

(86) PCT No.: PCT/EP2017/084631
§ 371 (c)(1),
(2) Date: Jun. 27, 2019

(87) PCT Pub. No.: WO2018/122253
PCT Pub. Date: Jul. 5, 2018

(65) Prior Publication Data
US 2020/0028367 A1  Jan. 23, 2020

(30) Foreign Application Priority Data

Dec. 30, 2016 (DE) .................... 10 2016 125 953.5

(51) Int. Cl.
*H02J 3/14* (2006.01)
*H02J 3/38* (2006.01)

(52) U.S. Cl.
CPC ............... *H02J 3/386* (2013.01); *H02J 3/14* (2013.01)

(58) Field of Classification Search
CPC ........ H02J 3/38; H02J 3/14; H02J 3/16; H02J 3/00; H02J 3/24; H02J 3/28; H02J 3/18;
(Continued)

(56) References Cited

U.S. PATENT DOCUMENTS 6,891,281 B2   5/2005   Wobben
6,965,174 B2   11/2005  Wobben
(Continued)

FOREIGN PATENT DOCUMENTS

CL    9702012       8/2012
CN    100438257 C   11/2008
(Continued)

OTHER PUBLICATIONS

Steve Völler, "Optimierte Betriebsführung von Windenergieanlagen durch Energiespeicher (Dissertation)", Nov. 13, 2009, 170 pages (with an English summary on p. 6).
(Continued)

*Primary Examiner* — Toan T Vu
*Assistant Examiner* — Xuan Ly
(74) *Attorney, Agent, or Firm* — Seed IP Law Group LLP (57) ABSTRACT

Provided is a method for operating a wind farm having a plurality of wind energy installations or a wind energy installation for feeding electrical power into an electrical supply grid, comprising the steps of: feeding electrical power into the electrical supply grid, identifying a forecast power, which describes a power that can be fed in in a predetermined, future forecast period by the wind farm or the wind power installation, determining a reduction forecast power, which denotes, for the forecast period, a power by which the power fed in in the forecast period can be reduced, and supplying the reduction forecast power as negative control power, wherein the reduction forecast power is determined depending on the forecast power and depending on a controllable consumption power, wherein the controllable consumption power describes a power that can be consumed on demand in the forecast period by controllable consumers present in the wind farm or in the wind power installation.

18 Claims, 6 Drawing Sheets

(58) Field of Classification Search
CPC . H02J 3/386; G05F 1/66; G05B 13/02; G05B
13/026; F03D 7/04; F03D 7/048; F03D
7/047; F03D 17/00; F03D 9/002; F03D
9/005
USPC ........ 307/84, 82, 80, 85; 700/297, 295, 291;
290/44
See application file for complete search history.

(56) References Cited

U.S. PATENT DOCUMENTS

| | | | |
|---|---|---|---|
| 6,984,898 B2 | 1/2006 | Wobben | |
| 7,199,482 B2 | 4/2007 | Hopewell | |
| 7,462,946 B2 | 12/2008 | Wobben | |
| 7,525,208 B2 | 4/2009 | Wobben | |
| 9,541,067 B2 | 1/2017 | De Boer | |
| 9,742,191 B2 | 8/2017 | Beckmann | |
| 9,957,952 B2 | 5/2018 | Giertz | |
| 10,063,093 B2 | 8/2018 | Beekmann | |
| 10,072,634 B2 | 9/2018 | Busker | |
| 10,320,315 B2 | 6/2019 | Beekmann | |
| 2005/0200133 A1 | 9/2005 | Wobben | |
| 2008/0001479 A1 | 1/2008 | Dengel et al. | |
| 2008/0195255 A1* | 8/2008 | Lutze | F03D 9/257 700/291 |
| 2010/0114395 A1 | 5/2010 | Hinatsu et al. | |
| 2010/0222935 A1 | 9/2010 | Forbes, Jr. et al. | |
| 2011/0175443 A1 | 7/2011 | Koyanagi et al. | |
| 2012/0091730 A1 | 4/2012 | Stuermer et al. | |
| 2012/0104756 A1 | 5/2012 | Beekmann et al. | |
| 2013/0001946 A1* | 1/2013 | Nielsen | H02J 3/386 290/44 |
| 2014/0225446 A1 | 8/2014 | Giertz | |
| 2014/0324243 A1* | 10/2014 | Markowz | H02J 3/32 700/297 |
| 2015/0069836 A1 | 3/2015 | Beekmann | |
| 2015/0115609 A1 | 4/2015 | Bohlen et al. | |
| 2015/0184632 A1* | 7/2015 | Sagi | H02J 3/381 290/44 |
| 2015/0311712 A1* | 10/2015 | Markowz | H02J 3/00 307/31 |
| 2016/0032891 A1 | 2/2016 | Busker et al. | |
| 2016/0226258 A1 | 8/2016 | Giertz | |
| 2017/0016430 A1* | 1/2017 | Swaminathan | F03D 7/047 |
| 2017/0030333 A1* | 2/2017 | Srivastava | H02J 3/381 |
| 2020/0028367 A1* | 1/2020 | Brombach | H02J 3/14 |

FOREIGN PATENT DOCUMENTS

| | | |
|---|---|---|
| DE | 102008052827 A1 | 5/2010 |
| DE | 102009018126 A1 | 10/2010 |
| DE | 102011088313 A1 | 6/2013 |
| DE | 102012215565 A1 | 3/2014 |
| DE | 102013208474 A1 | 11/2014 |
| DE | 102013222452 A1 | 5/2015 |
| EP | 1739824 A2 | 1/2007 |
| EP | 2411669 | 2/2012 |
| EP | 2791503 B1 | 7/2016 |
| EP | 3031115 B1 | 11/2019 |
| JP | 9-233705 A | 9/1997 |
| JP | 20009021 A | 1/2000 |
| JP | 2007249341 A | 9/2007 |
| JP | 2009-77457 A | 4/2009 |
| JP | 2011103736 A | 5/2011 |
| JP | 2016515675 A | 5/2016 |
| JP | 2016521538 A | 7/2016 |
| JP | 2016154411 A | 8/2016 |
| KR | 101408404 B1 | 6/2014 |
| KR | 20140138957 A | 12/2014 |
| KR | 20160000285 A | 1/2016 |
| RU | 2404290 C2 | 11/2010 |
| TW | I225328 B | 12/2004 |
| WO | 03/077398 A2 | 9/2003 |
| WO | 2010/048706 A1 | 5/2010 |
| WO | 2010108910 A2 | 9/2010 |
| WO | 2013/135504 A1 | 9/2013 |

OTHER PUBLICATIONS

Carrasco et al., "Power-Electronic Systems for the Grid Integration of Renewable Energy Sources: A Survey," *IEEE Transactions on Industrial Electronics* 53(4):1002-1016, Aug. 2006.

* cited by examiner

METHOD FOR OPERATING A WIND FARM

BACKGROUND

Technical Field

The present invention relates to a method for operating a wind farm having a plurality of wind power installations. The present invention also relates to a corresponding wind farm.

Description of the Related Art

Wind farms are known. They have a plurality of wind power installations and feed into an electric supply grid by way of said wind power installations via a common grid connection point. In addition to said main task of energy infeed, such wind farms can also undertake tasks for supporting the electrical supply grid or at least to make a contribution.

An important, at least possible, contribution to grid support consists in reducing the infed power when required. Wind power installations and therefore wind farms in this case have the property of being able to reduce their infed power very quickly. For example, they can halve their infed power within a few seconds. Therefore, wind power installations or wind farms are basically the generators in an electrical supply network that are able to reduce their power the most quickly without problems. This means, in particular, that they can also make their power available again practically equally as quickly after the reduction. Particularly for situations in which too much power is temporarily present in the relevant electrical supply grid, rapid support can therefore be achieved by wind power installations owing to likewise temporary reduction of the power.

In order to be able to guarantee a continuously stable electrical supply grid, it is important for the operator of the electrical supply grid, who is also referred to simply as grid operator, to have information about the power in order to be able to reduce said power. Wind power installations or wind farms can also readily reduce their infed power completely in a short time, which requires in this respect, however, that power is fed in too. In the case of a wind farm, infed power also depends, in particular, on the prevailing wind speed.

In order to make it possible for the grid operator to plan, for example, one day in advance, a wind forecast or weather forecast can be carried out in order to estimate the power that can be fed in for the forecast period and therefore also the power that can be reduced.

Therefore, such an expected power can be estimated and the grid operator can include this in his planning, but the power is not known so reliably that the grid operator can definitely count on it. For this reason, a kind of risk assessment is often carried out, which assumes that only a few percent, for example 3%, of a forecast power can actually be considered to be secured. Thus, if a power of 1 MW is forecast, a reliability consideration set at 3% leads to a secured support value of 30 kW. Accordingly, only said reliability value is taken as a basis in the case of payment of this system service. In other words, in the mentioned exemplary case, a negative minutes control power of 1 MW could be made available, whereas only 30 kW can be marketed, however.

In the priority application for the present PCT application, the German Patent and Trade Mark Office searched the following prior art: DE 10 2012 215 565 A1 and US 2016/0226258 A1.

BRIEF SUMMARY

Provided is a method for a wind farm to be able to provide the highest possible negative control power, in particular minutes control power, namely also to be able to reliably make said power available for a preplanned period so that the grid operator can definitely expect said power or can market said power to the grid operator.

Provided is a method involving a wind farm having a plurality of wind power installations. Electrical power is generated from wind using said wind power installations and said electrical power is fed into an electrical supply grid by said wind farm, namely usually via a grid connection point. Electrical power is thus accordingly fed into the electrical supply grid.

In principle, just one wind power installation can be used instead of a wind farm. The wind power installation can in this case operate in principle like a wind farm but usually delivers less power than a wind farm and is therefore often not so relevant for grid support but it is considered. All of the following descriptions relating to a wind farm also apply accordingly to a wind power installation as long as it does not relate to particularities of the wind farm that cannot be transferred to a wind power installation, such as, for example, features relating to the coordination of a plurality of wind power installations in a wind farm.

Furthermore, a forecast power is identified. The forecast power is a power that can be fed in in a predetermined, future forecast period by the wind farm. In particular, in this case a wind or weather forecast is carried out, from which it is then possible to derive how much power the wind farm can feed in, for example, in the next 24 hours. In this case, whether all of the wind power installations are operationally ready or, for example, have to undergo maintenance is preferably also taken into account, to mention just one example of a boundary condition. The weather forecast can also take into account, for example, whether ice is to be expected and, accordingly, some wind power installations cannot be operated and/or can be operated only with simultaneous heating of the blades, to mention a further example of a consideration.

A reduction forecast power is also determined for the forecast period. Said reduction forecast power is the power by which the power fed in in the forecast period can be reduced.

The reduction forecast power is then supplied as negative control power, in particular as marketable negative control power. For this purpose, for example, the wind farm transmits signals to a grid operator, said signals containing the information regarding the time at which or the period in which and by how much power the wind farm can reduce the infed power thereof.

It is now proposed that the reduction forecast power is determined depending on the forecast power and depending on a controllable consumption power. The determination of the forecast power has already been explained and the controllable consumption power is a power that can be consumed on demand in the forecast period by controllable consumers present in the wind farm. Such controllable consumers may be, for example, a blade heating system or a fan, to mention just two examples. However, consumers that are not a direct part of a wind power installation but are part of the wind farm are also taken into consideration. Electrical lines in the wind farm can also be used as electrical consumers. Considered here are at least consumers that can be actuated on demand. It is thus consumers that can be actuated in a targeted manner in response to a demand, in particular a demand generated by a central control unit, for the consumption of power that are involved here. Particularly, the point here is that such consumers are actuated in addition to and/or independently of their usual purpose. The usual purpose of a blade heating system, to stay with this example, is to heat the rotor blade concerned for the purpose of deicing or for the purpose of protecting against icing up. However, such a blade heating system can also be operated when there is no icing up or there is none to prevent. If said blade heating system, mentioned by way of example, can also be actuated irrespective of the original purpose thereof, namely deicing or preventing icing up, in particular by a central farm control unit, said blade heating system is a consumer that can be controlled on demand and can provide a controllable consumption power.

To address a further example that has already been mentioned, namely transmission lines in the wind farm, the original purpose thereof is to transmit power, namely, in particular, from a respective wind power installation to a grid connection point. In this case, if reactive power is also now transmitted by a wind power installation, which power is taken up by another wind power installation or to which accordingly compensating reactive power is fed in by another wind power installation, said line is then operated as a controllable consumer and is a controllable consumer, when such a consumption power can be controlled on demand, in particular on demand by the central farm control unit. In particular, at least one wind power installation can generate a reactive current such that, as a result, reactive current is taken up from the electrical supply grid and fed to a power consumption in the electrical line.

It is now proposed to take into account, for the entire wind farm, how much of such consumption power or other controllable consumption power is present or can be activated. Said overall controllable consumption power that is present or can be activated and the already explained forecast power are now taken as a basis to determine the reduction forecast power depending thereon.

In particular, it has been mentioned here that now the reduction forecast power can be increased in terms of its magnitude by said controllable consumption power. The forecast power is possibly not known exactly or not sufficiently reliably and can therefore possibly only be taken into account for the determination of the reduction forecast power, but it can still also be taken into account. A minimum value is preferably used by the forecast power for a time period within the forecast period so that the reduction forecast power for the forecast period concerned is calculated depending on said minimum value.

In addition, the determination of the reduction forecast power also involves the controllable consumption power, which also regularly has the advantage that it can be considered as secured at least up to a certain degree. To stay with the mentioned example of the blade heating system, the power take-up of said blade heating system is known and it is also well known whether said blade heating system is otherwise required in the forecast period at all or is available as controllable consumption power. If it is thus, for example, warm enough, it is not expected that said blade heating system is required. It is then preferably also taken into account whether, depending on the outside temperature, only partial heating is possibly considered in order to prevent overheating. However, it can regularly be the case that the blade heating system can also be operated permanently up to the rated value thereof. Said rated value is then available as controllable consumption power and can be used for the determination of the reduction forecast power.

The reduction forecast power can thus be made up of a portion of the forecast power and the controllable consumption power. These values can be added namely according to the magnitudes, that is to say the magnitude of the portion of the forecast power and the magnitude of the controllable consumption power that can be taken into account.

It is preferably proposed that the infed power is reduced by a value up to the level of the reduction forecast power in response to a demand for grid support in the forecast period. It is thus assumed that a reduction forecast power has been determined and, for example, transmitted as a supply to the grid operator or the grid control station thereof. If such a supporting case in which the grid operator makes recourse to said forecast and supplied reduction forecast power now arises, the wind farm reduces the infed power thereof accordingly. The grid operator can then namely utilize a proportion of the supplied reduction forecast power or he can fully utilize said supplied reduction forecast power. The wind farm then reduces the infed power thereof by the value utilized by the grid operator.

In this case, however, the wind farm does not necessarily need to actuate the controllable consumers but can first reduce the infed power. The infed power corresponds in the ideal case to the previously forecast power, that is to say the forecast power of the forecast period in which the wind farm is then situated. Said forecast power has been taken into account in the determination of the reduction forecast power that has been supplied by the grid operator, but not exclusively. It should be noted, in particular, that only a proportion of the forecast power has been taken into account in the determination of the reduction forecast power. It is thus now very likely that more power is fed in than has been supplied as definitely infed power in the determination of the reduction forecast power. The presently infed power can also accordingly be reduced by more accordingly.

To mention a simple example, a forecast power of 1 MW may have been forecast. 3% thereof has been taken into account as a reliable value for the determination of the reduction forecast power, that is to say 30 kW, to stay with the example already mentioned above. In addition, the fact that there is a controllable consumption power of 300 kW is taken into account. Thus, the reduction forecast power for this example is then 330 kW. However, when the power that is forecast, that is to say the forecast power, is actually set, namely at the level of 1 MW, and the grid operator would like to make recourse to the full reduction forecast power, this means that a reduction of the infed power by 330 kW is demanded. Thus, the infed power can then be reduced to 670 kW, without only one of the controllable consumers also being actuated on demand, in order to decrease the controllable consumption power or a proportion thereof.

The decisive factor was that this exemplary 330 kW could not only be supplied but also could be supplied reliably. The controllable consumption power is also required for this purpose so that the grid operator could rely on said 330 kW. When the actual support case arises, a reduction in just the actually infed power can still be taken into consideration. However, the entire or a proportion of the then demanded reduction power can of course also actually be fulfilled by the controllable consumers. Whether it is expedient to reduce the generated power or to decrease a proportion of the generated power by way of the controllable consumers can be decided upon individually and also depend on the type of consumer, for example.

However, the case that actually significantly less power is generated and fed in than originally forecast as forecast power is also taken into consideration. Thus, for example, if less power than forecast is generated and fed in and a high reduction power is then demanded, the fact that power is also drawn from the grid by the wind farm also comes into consideration. Negative power is then thus fed in.

Thus, for example, to stay with the above example, if only a power of 200 kW is fed in and the grid operator demands the fully supplied reduction forecast power as reduction power, that is to say he requires 330 kW of reduction power, the power generation by the wind farm can be reduced to zero, as a result of which the infed power is reduced by 200 kW. In addition, 130 kW can be drawn from the grid and consumed by the controllable consumers. The wind farm has then reduced its infed power by a total of 330 kW, that is to say as supplied and as required now by the grid operator too, namely from 200 kW to −130 kW. This is also only an example that could be realized even with a single wind power installation. The method can actually also be carried out with a single wind power installation. However, greater powers than support powers are often desired by the grid operator, with the result that the use of a wind farm having a plurality of wind power installations is then advantageous.

It is therefore preferably proposed that one or more of the controllable consumers are switched on and/or the power decrease thereof is controlled so that the infed power is reduced as a result, wherein power is additionally drawn from the electrical supply grid and is consumed when the infed power that has not yet been reduced is lower than the reduction forecast power and also lower than a demanded reduction power. When the infed power that has not yet been reduced is thus lower than the demanded reduction power, the demanded reduction power is realized at least partly by way of the controllable consumers. In this case, it is assumed that the reduction power is also demanded at the maximum only up to the reduction forecast power. Of course, providing or decreasing more reduction power than the reduction forecast power too should not be excluded. However, the determination and supply of the reduction forecast power does not initially proceed from this special case.

The reduction forecast power is preferably determined so that it is made up at least of the production power or a value thereof, multiplied by a prescribable quality value, and the controllable consumption power. This forecast power is therefore a power that is expected in the forecast period and depends particularly, but not necessarily exclusively, on a wind and/or weather forecast. In order to derive a reliably expected power from said forecast power, said forecast power is multiplied by a prescribable quality value, which therefore has to be <1 but >0. Said quality value may be, for example, 3%. The calculation can also be effected for a time period. If the forecast power fluctuates over said time period, a minimum value of the forecast power can be used.

The controllable consumption power is then involved. Said forecast power multiplied by the prescribable quality value or the forecast power value multiplied therewith and the controllable consumption power are added to form the reduction forecast power. A corresponding example has already been specified and explained above.

The respective availability forecast for each controllable consumer is preferably also still taken into account for the determination of the controllable consumption power. An explanation for the example of a blade heating system as controllable consumer has also already been given above, according to which the operability of the blade heating system depends, on the one hand, on whether it is considered at all as a contribution for the reduction forecast power or, on account of the weather, it is possibly already used according to its actual purpose, namely deicing the blades or preventing icing up. If said blade heating system is used mainly for deicing or as a means for protecting against ice formation, the consumable power thereof cannot be part of the reduction forecast power since it cannot take up additional power in the case of cases when infed power has to be reduced. In this case, the availability that is forecast would be zero.

As a further example it has also been mentioned that the blade heating system cannot be operated to the maximum on account of very high temperatures in the surroundings because this could lead to high temperature values. Thus, if the blade heating system could be operated only at 50% of the rated power thereof, for example depending on the weather forecast, in particular the unfavorable weather forecast, the value of 0.5 or 50% would be considered here as the availability that is forecast.

In accordance with one embodiment, it is proposed that the controllable consumption power is made up of a plurality of power proportions. Each power proportion is associated with a controllable consumer and therefore describes the power of said controllable consumer that is to be taken into account. At least one of said power proportions is calculated in this case from a maximum power of the controllable consumer thereof multiplied by an availability of the controllable consumer thereof that is forecast. Preferably, a plurality of power proportions are calculated in this way, in each case based on the controllable consumers thereof and also in each case based on an availability of the controllable consumer thereof that is forecast. Preferably, all of the power proportions are calculated in this way.

Thus, for example, the controllable power may be the sum of two power proportions. In this case, the first power proportion could be associated, for example, with the blade heating system already mentioned above. The maximum power of said consumer, that is to say said blade heating system, may be the rated power of the consumer. For example, the blade heating system could have a rated power of 200 kW. If, as already stated above in accordance with one example, the weather forecast has revealed that only 50% of the power of the blade heating system can be used for the reduction forecast power, the first power proportion would result here as the product of 200 kW as the maximum power of the consumer multiplied by 50%, that is to say 0.5 as the availability that is forecast. In this example, the first power proportion would be 100 kW.

The second power proportion could be associated with a transmission line in the farm, including an inverter connected therewith, which transmits or takes up a reactive power or a reactive current via said line. As a result thereof, a maximum of 100 kW of power could be consumed and less power could be consumed the more said power or the at least one associated inverter is required for generating or transmitting power to be fed in. Thus, if the forecast is such that a lot of wind is expected and a lot of power can be fed in, the line can be used, for example, only up to 30% for the consumption of power. A value of 100 kW multiplied by 30% would therefore result for the second power proportion, such that 30 kW result.

In this last illustrative example for the second power proportion, however, instead of the availability that is forecast of 30%, the value of 1, that is to say 100%, can still be applied since the availability that is forecast of 30% results only when a lot of power is fed in. However, very large amount of power can then also be provided as the reduction power in the case of cases when a power reduction has to be carried out. The line as an additional consumer would be required only when, counter to the wind forecast, only very little power would be fed in or even no power at all. In this case, however, the transmission line could also be used completely as a controllable consumer.

In the present example, the controllable consumption power would thus result at 200 kW, namely from the first power proportion at 100 kW and the second power portion likewise at 100 kW.

It is preferably proposed that the controllable consumers are actuated by a central farm control unit of the wind farm. Said controllable consumers of the wind farm can therefore be controlled and hence monitored by means of said central farm control unit of the wind farm, which can also be referred to in simplified terms as wind farm controller. Furthermore, said controllable consumers can also be taken into account thereby for the farm overall and preferably the central farm control unit carries out the calculation or determination of the controllable consumption power in terms of the level. In particular, said farm control unit also carries out the determination of the reduction forecast power. As a result, the wind farm can operate in or at the grid as a unit for such grid support by supplying negative control power, namely by supplying the reduction forecast power.

It is furthermore or alternatively proposed that the central farm control unit receives a demand signal from a grid control station provided to control the electrical supply grid. Said demand signal can then form the demand for grid support. Furthermore, said central farm control unit preferably operates so that it reduces the infeed power depending on said demand and, where necessary, actuates the controllable consumers accordingly. As a result, the grid control station and therefore, in particular, also the grid operator operating the electrical supply grid can advantageously use a wind farm for grid support. In particular, a high negative control power can be activated in a very short time by the grid control station. At least a proportion of said negative control power can be realized by actuating consumers, which can also be referred to in this respect as loads. In this case, it is also considered to connect or disconnect consumers or to control consumers in each case in terms of the level of their consumption. The power of each wind power installation that is output can also be controlled in terms of the level thereof. In particular, through a combination of controlling loads and controlling the output power of the wind power installations, within technical limits, basically every operating point can be started up, that is to say the power output of the wind farm can be set continuously.

In accordance with a further embodiment, it is proposed that at least one energy store is present in the wind farm in order to provide at least temporarily additional power to the wind power generated by the wind power installation of a wind farm for feeding into the electrical supply grid. Such an energy store, which may be, for example, a battery store, can therefore feed additional power into the electrical supply grid; it can at least provide power therefor.

To this end, in accordance with the mentioned embodiment, it is now proposed that the reduction forecast power is determined also depending on available power of the at least one energy store. In this case, the reduction forecast power can thus also take into account power fed into the electrical supply grid by said energy store and by which the power fed into the electrical supply grid can therefore also be reduced. Taking into account such a power of the at least one energy store has the advantage, in particular, that it can also be forecast reliably, since the storage content of said energy store would have to be known and also the capacity thereof, in order to feed power into the electrical supply grid, that is to say which maximum discharge currents are permissible.

Furthermore or alternatively, such power, which the energy store can take up from the electrical supply grid, can also be integrated here concomitantly in the determination of the reduction forecast power. Said power can also be forecast very well for the energy store and, as a result, the supplied reduction forecast power can be increased by an accordingly reliable value.

The reduction forecast power is preferably used as negative minutes control power. The grid operator can thus demand from the relevant wind farm that said wind farm temporarily reduces the infed power thereof up to the level of the reduction forecast power. Said reduction can be demanded and carried out within a few seconds. In particular, it is proposed that said reduction is realized within a few seconds, particularly within 30 s, preferably within 20 s and, in particular, within 10 s. Said reduction is also preferably realized in this case only for one or a few minutes, in particular less than 10 min. The power infeed of the wind farm is thus reduced in a time <1 min and the reduction preferably lasts only a few minutes. Such grid support can regularly suffice for transient processes for support that occur temporarily in the electrical supply grid. It is important that the grid operator can rely upon the fact that such reduction up to the level of the supplied reduction forecast power can also be demanded.

In accordance with one embodiment, it is proposed that a central consumption control unit is provided to actuate or to coordinate the actuation of one, several or all of the controllable consumers. Said central consumption control unit is preferably coupled to the central farm control unit and receives a total consumption setpoint value from the central farm control unit. Said total consumption setpoint value indicates the value by which the consumption of the controllable consumers should be reduced overall. The central farm control unit can therefore prescribe such a total consumption setpoint value and the specific implementation or coordination is effected by the consumption control unit. As a result, in particular, a structure can be simplified and the central farm control unit needs to coordinate a reduction of the generated power only with respect to the infed power and the demanded reduction power, namely demanded by the grid operator. Said central farm control unit can reduce the infed power and, when there is a requirement for further power reduction, transmit said requirement as the total consumption setpoint value to the consumption control unit, which deals with the coordination. The consumption control unit is preferably also used to calculate the total controllable consumption power. Said value can be given to a forecast determination means, which may be part of the central farm control unit, in order that said forecast determination means or the central farm control unit can determine and supply the reduction forecast power taking into account said controllable consumption power.

The forecast power and furthermore or alternatively the reduction forecast power are preferably specified as a time profile over the forecast period. Time profiles can therefore be taken into account and stored. In particular, corresponding wind and/or weather forecasts that regularly fluctuate over time can also be taken into account therein.

The forecast period is preferably approximately 24 hours. Said forecast period can also be set to be shorter or longer. Preferably, said forecast period is in the range of 12 to 48 hours, further preferably in a range of 18 to 36 hours. In particular, said forecast period is approximately one day. As a result, a predictability of approximately one day is achieved for the grid operator. At the same time, said forecast period of approximately 1 day is a period for which a wind and/or weather forecast or weather prediction can be made with a very good degree of accuracy and reliability.

The forecast period is preferably divided into 4-hour time periods and a reduction forecast power is determined for each of said time periods. A reduction forecast power can therefore be supplied and, in particular, marketed for each of said time periods. As a result, a grid operator can book such reduction forecast powers for 4-hour time periods in order to thereby have the opportunity in the time periods booked in this way to demand a negative control power when required.

Said forecast period is preferably divided into intervals, in particular into intervals of approximately 15 min, that is to say approximately four intervals per hour. Such a temporal division into intervals provides the possibility of mapping a change over time of the conditions over the forecast period, wherein at the same time, however, in each case stable values can be made available in the intervals. It is therefore also possible to achieve a situation in which no large amounts of data have to be transmitted between the wind farm and the grid operator or between the wind farm and the grid control station.

Provided is a wind farm. Said wind farm comprises an infeed apparatus for feeding electrical power into the electrical supply grid. Such an infeed apparatus can be provided, in particular, as an inverter at each of the wind power installations. Furthermore, a transformer can be provided at the grid connection point at which or via which the infeed into the electrical supply grid takes place.

Furthermore, said wind farm comprises an identification apparatus for identifying a forecast power, which describes a power that can be fed in in a predetermined, future forecast period by the wind farm. The identification apparatus can contain, in particular, a process computer, which is supplied with appropriate information required to identify the forecast power.

Furthermore, a forecast determination means is proposed, said forecast determination means being prepared to determine a reduction forecast power, which denotes, for the forecast period, a power by which the power fed in in the forecast period can be reduced. Such a forecast determination means can also be designed as a process computer or comprise same. The forecast determination means may also be part of the identification apparatus or vice versa. The identification apparatus and/or the forecast determination means may be part of a central farm control unit.

Furthermore, a supply means for supplying the reduction forecast power as negative control power is proposed. The supply means can likewise contain a process computer and a communication interface for communicating with a grid control station. Data can be exchanged between the grid control station and the supply means via said communication interface. In particular, the supply means can transmit values that indicate the reduction forecast power according to the level thereof to the grid control station via said communication interface. The communication is preferably configured so that such values are transmitted at predetermined spacings such as, for example, every 15 minutes.

The supply means can in this case also be part of the identification apparatus and/or of the forecast determination means and/or part of the central farm control unit.

Furthermore, the wind farm has at least one controllable consumer, which can consume power on demand. A plurality of controllable consumers are preferably provided.

For such a wind farm, it is now proposed that the identification apparatus is configured so that the reduction forecast power is determined depending on the forecast power and depending on the controllable consumption power, in particular as has been described above. In this case, the controllable consumption power describes how power can be consumed on demand in the forecast period by the controllable consumers present in the wind farm.

An individual requirement of the wind power installation, which is required, for example, for fans or heaters or else for illumination, can also be considered to be a controllable consumer. For a modern wind power installation, such an individual requirement can be, for example, at 100 kW and have an availability of 100%.

An additional individual requirement of 100 kW can be assumed depending on the operating point, said individual requirement being able to be connected as a consumer depending on the operating point of the wind power installation. This can also relate to fans, heaters or converter cabinets as controllable consumers that are in a stand-by mode: Since said consumers are used to a low proportion according to their actual purpose and then not actuated arbitrarily as consumers for reducing the power fed in or that can be fed in, a reduced availability is to be assumed, which may still be at 98%.

Inverters or converters operating as infeed apparatus can also be considered as further consumers. If they are not fully utilized, they accordingly consume less than in the case of full utilization. Said difference from the full utilization can also be used as controllable consumption. For this purpose, the converter or the converters of a plurality of wind power installations can be operated, for example, by mutual compensated reactive power provision, namely in STATCOM operation. As a result, approximately 100 kW with an availability of 90% can be used for each modern wind power installation. In this case, the converter and/or the used line respectively is then the controllable consumer.

The rotor blade heating system, which can also be referred to simply as blade heating system and has already been described above as an example, can be mentioned as a further consumer. As a result, in a modern wind power installation, approximately 500 kW with an availability of 98% can be used for each modern wind power installation, depending on the operating point. The wind farm is preferably configured to implement a method in accordance with at least one embodiment described above. The wind farm preferably has a central farm control unit, which contains the infeed apparatus, the identification apparatus, the forecast determination means and/or the supply means or communicates with said central farm control unit or is configured for such communication, in particular has appropriate communication interfaces.

A central consumption control unit is preferably provided to actuate or to coordinate the actuation of one, several or all of the controllable consumers. Said central consumption control unit is preferably coupled to the central farm control unit and is prepared to receive a total consumption setpoint value from the central farm control unit, said total consumption setpoint value indicating the value by which the consumption of the controllable consumers should be reduced overall. In particular, the central consumption control unit also has a communication means for communicating with the central farm control unit. Alternatively, the central consumption control unit is part of the central farm control unit.

In accordance with one configuration, at least one of the consumers is configured as an externally switchable consumer in order to be switched on by a control device in the wind farm for the purpose of power consumption. Such a consumer can be referred to in simplified terms as a switchable consumer. Furthermore or as an alternative, at least one of the consumers is configured as a consumer whose received power can be controlled from the outside in order to be controlled by the control device in the wind farm for the purpose of power consumption with a power whose level can be adjusted. Such a consumer can be referred to in simplified terms as a consumer with controllable level. This is to be understood as meaning that the consumer can be switched or controlled from the outside so that the consumer is not only switched or actuated by itself or the device in which it is installed but instead that it is basically externally controlled by a device in the wind farm and the controller is switched or controlled in this respect outside of the actual field of application.

The control device may be the central farm control unit or the consumption control unit. The central farm control unit can thus also undertake said switching and/or control of such consumers, for example.

To accurately set a power reduction of the power fed in by the wind farm, the switchable consumers, the consumers with controllable level and the wind power installations can be actuated accordingly with respect to the generated power thereof.

To mention a simple example: If a wind farm generates and feeds in 100 kW of power and then has to reduce the infed power thereof by 200 kW, said wind farm can for this purpose switch a switchable consumer with 150 kW and reduce the generated power by 50 kW. The infed power is then reduced from +100 kW to −100 kW, wherein the wind farm generates 50 kW and the switchable consumer consumes 150 kW.

The wind farm preferably has at least one energy store in order to provide at least temporarily additional power to the wind power generated by the wind power installations of the wind farm for feeding into the electrical supply grid. Such an energy store can also be present in a wind power installation or such an energy store can be provided in each case in several or all of the wind power installations of the wind farm. In this case, it is proposed that the at least one energy store is prepared to reduce the additional power on demand by a grid operator. Furthermore, said energy store is prepared to provide a piece of information about the state of charge thereof and/or a prediction about power that can be reduced in the forecast period. In particular, said energy store is prepared to transmit such piece of information to the central farm control unit.

The at least one energy store can therefore not only feed in additional power but power can also be reduced on demand by a grid operator so that the energy store can in this way provide a negative control power, in particular a negative minutes control power. To this end, said energy store can furthermore provide a corresponding piece of information about the state of charge thereof and the power reduction capability thereof. It is therefore possible that said energy store can also concomitantly be used for the calculation of the reduction forecast power.

To this end, the energy store has, in particular, an appropriate communication apparatus in order to communicate with the relevant devices or means in the wind farm. In particular, it is proposed that such communication takes place with the central farm control unit, which can transmit and further process the relevant information thereby. In the case of a reduction demand by the grid operator, this can be transmitted, in particular, from a grid control station to the central farm control unit, wherein the central farm control unit can then transmit a corresponding reduction signal to the energy store.

The controllable consumers of the wind farm are preferably likewise able to be actuated centrally, namely, in particular, via the central farm control unit and/or via the central consumption control unit and/or via a central data network.

Provided is a wind power installation that operates substantially or analogously as has been described above with respect to embodiments of a wind farm.

The wind power installation is preferably prepared to be used in a wind farm described above in accordance with at least one embodiment and/or to execute a method described in accordance with at least one embodiment or to take part in said method. Both the use in a wind farm and the use in a described method mean, in particular, that the wind power installation provides information about the operation thereof and about the consumers thereof and/or that said wind power installation and/or the controllable consumers thereof can be actuated to set a power to be generated or a power to be output or that any switchable consumers can be switched on and off, namely by an external control unit that is not part of the wind power installation or of the consumer.

BRIEF DESCRIPTION OF THE SEVERAL VIEWS OF THE DRAWINGS

The invention is now described in more detail below by way of example on the basis of embodiments with reference to the accompanying figures.

DETAILED DESCRIPTION

Figure 1:
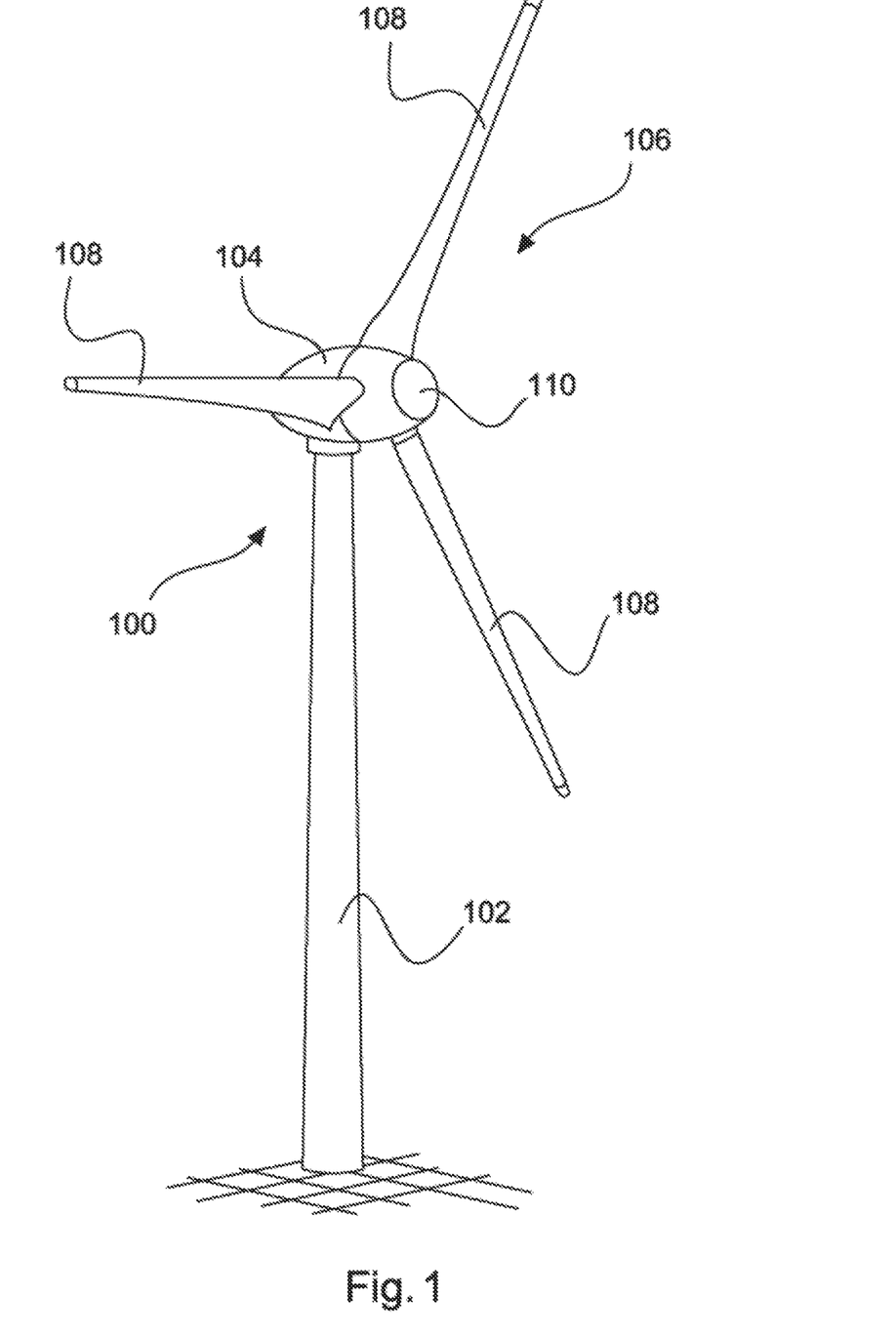
FIG. 1 shows a perspective illustration of a wind power installation.

FIG. 1 shows a wind power installation 100 with a tower 102 and a nacelle 104. Arranged on the nacelle 104 is a rotor 106 with three rotor blades 108 and a spinner 110. During operation, the rotor 106 is set in rotation by the wind and thereby drives a generator in the nacelle 104.

Figure 2:
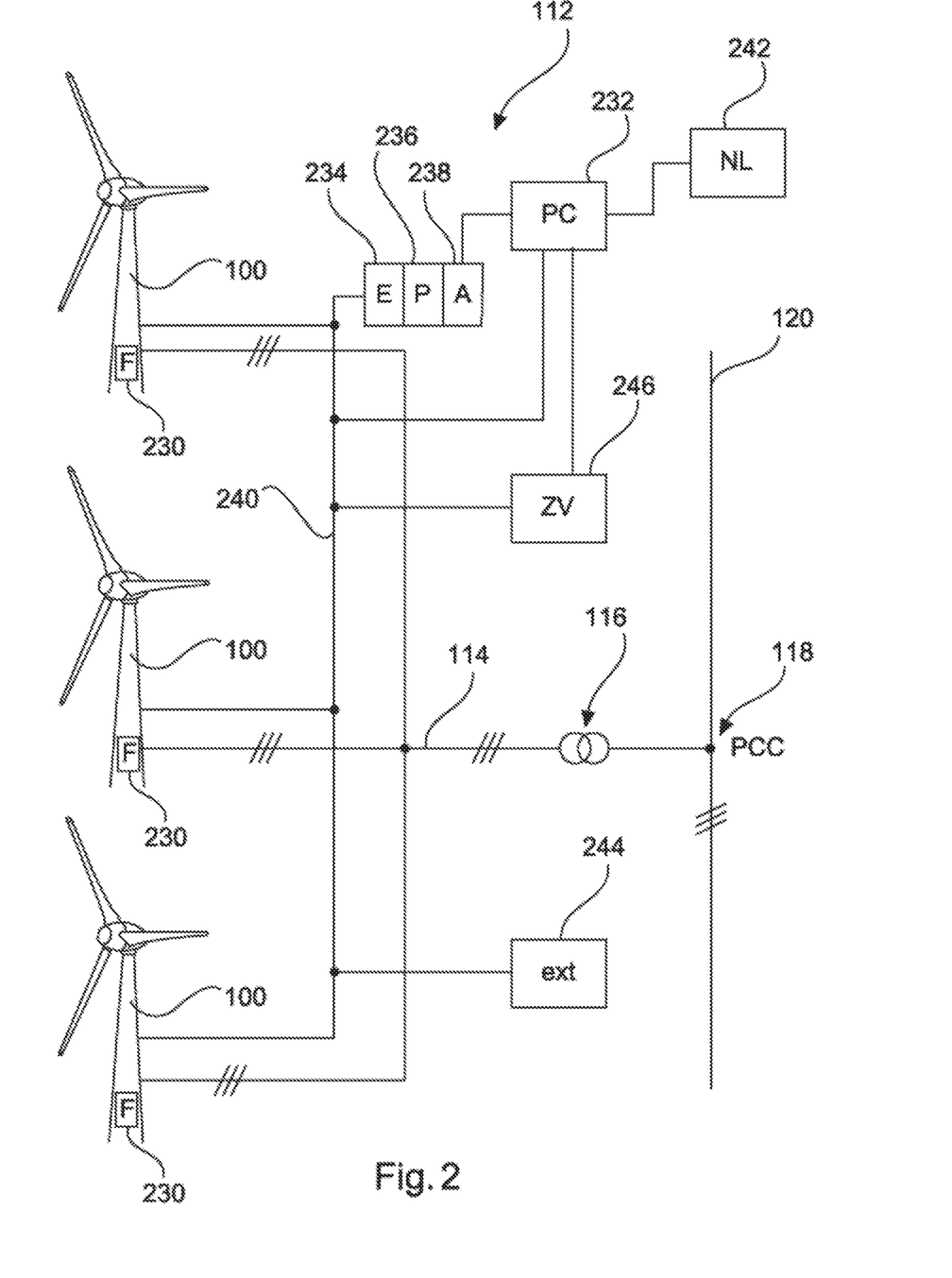
FIG. 2 shows a schematic illustration of a wind farm.

FIG. 2 shows a wind farm 112 having, by way of example, three wind power installations 100, which may be identical or different. The three wind power installations 100 are thus representative of basically any desired number of wind power installations of a wind farm 112. The wind power installations 100 provide their power, namely, in particular, the generated current, via an electrical farm network 114. In this case, the respectively generated currents or powers of the individual wind power installations 100 are added and a transformer 116 is usually provided, which steps up the voltage in the farm in order to then feed into the supply grid 120 at the infeed point 118, which is also generally referred to as PCC. FIG. 2 is only a simplified illustration of a wind farm 112, which only shows by way of example three wind power installations, although more than three wind power installations are often provided in a wind farm. For example, the farm grid 114 can also be designed in another way by virtue of, for example, a transformer also being present at the output of each wind power installation 100, to mention just one other exemplary embodiment.

The wind farm 112 of FIG. 2 feeds into the electrical supply grid 120 by means of a plurality of infeed apparatuses 230. The infeed apparatuses 230 are in this case part of the wind power installations 100. Each infeed apparatus 230 may be, for example, a frequency inverter, which generates a corresponding three-phase current, which is then fed into the electrical supply grid 120 via the transformer 116. A central farm control unit 232 is provided for the overall control of the wind farm 112. Furthermore, an identification apparatus 234 is provided to identify a forecast power, said identification apparatus being coupled to a forecast determination means 236. The forecast determination means determines a reduction forecast power and this can be supplied by the supply means 238 as a negative control power. The terms reduction forecast power and negative control power can also be used synonymously. The identification apparatus 234, forecast determination means 236 and the supply means 238 can also be combined to form one control unit, which is indicated in FIG. 2.

Information of the wind power installations 100, which is transmitted via the data network 240, namely, in particular, to the identification apparatus 234 and via same to the forecast determination means 236, serves as a basis for the identification of the forecast power and to determine the reduction forecast power. The data identified or determined here can be transmitted to the central farm control unit 232, for example from the supply means 238. The identification apparatus 234 and/or the forecast determination means 236 and/or the supply means 238 may be part of the central farm control unit 232.

In particular, the determined reduction forecast power can then be supplied to a grid control station 242 by the central farm control unit 232. The grid control station 242 can then also demand a negative control power in the case of cases when appropriate grid support appears to be necessary. This can likewise take place by means of communication with the central farm control unit 232. The central farm control unit 232 is provided in this case so that it can then actuate the wind power installations 100 accordingly or prescribe appropriate setpoint values. To this end, said central farm control unit can also draw on the data network 240. In addition, the fact that the negative control power is also resolved by appropriate actuation of consumers in the wind farm 112 is also taken into account. Such consumers may be part of every wind power installation 100, such as, for example, fans in the wind power installation 100, which are known as such and are therefore not illustrated specifically in FIG. 2. However, external consumers are also considered, for which in this case an external consumer 244 is indicated. The actuation and, in particular, also coordination of the consumers for decreasing power and thereby providing negative control power is effected by a central consumption control unit 246. Said central consumption control unit 246 can also be actuated for this purpose by means of the central farm control unit 232 and the central consumption control unit 246 can actuate the consumers, including the external consumer 244, via the data network 240.

Figure 3:
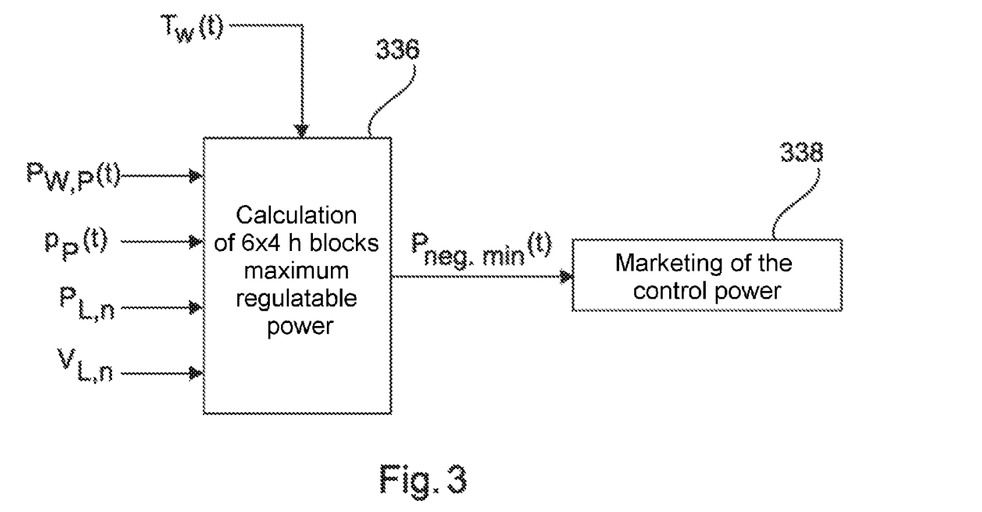
FIG. 3 shows a structure for determining a reduction forecast power that can be supplied.

FIG. 3 illustrates in the shown structure, in particular, the forecast determination means 236 of FIG. 2, which is shown here as a forecast determination block 336. The forecast determination block 336 receives as input variables from a weather forecast, in particular, the temperature values that are forecast or the temperature profile that is forecast, which is used in the forecast determination block 336 as $T_W(t)$. The temperature can, for example, influence the expected operation of the wind power installation. In the most unfavorable case, too low a temperature can lead to the shutdown of the installation. In other cases, the installation is operated in a reduced manner or a heating system is operated.

A further value used depending on a wind prediction, which may be part of the weather prediction, is a forecast wind power or a profile of the forecast wind power, which is illustrated here as $P_{W,P}(t)$.

Furthermore, a forecast uncertainty $p_P(t)$ is used. Said forecast uncertainty depends, in particular, on the quality and the boundary conditions of a weather prediction and can be specified as a probability mass distribution. It often results in a value of 3%. This means that when 3% of the forecast power is supplied every quarter of an hour as negative control power, this can be achieved with a probability of 99.98% of the quarter-hour values. The value of 3% can constitute a currently conventional value but which can be increased, in particular, when forecast abilities, particularly of the wind, are improved, with the result that a forecast uncertainty is provided here as an input variable. Furthermore, for each consumer in the wind farm, the consumption power $P_{L,n}$ characterizing same is used. The characterizing power $P_{L,n}$ may be, in particular, the rated power thereof and/or the maximum power thereof. Said value is a characterizing variable and in principle a fixed value. FIG. 3 shows for this purpose an input variable $P_{L,n}$ but which is only representative of the corresponding power of each consumer. This is indicated by the index n. Thus, such a value is used for each consumer taken into account.

Furthermore, for each consumer, an availability value $V_{L,n}$ is used as a relative value, in particular as a percentage value. This indicates for each consumer whether and at what level it is available. The value can range from 0 to 100%, wherein 0% indicates that the consumer is not available, whereas 100% indicates that the consumer is available at the full level of the characterizing power $P_{L,n}$ thereof.

A maximum regulatable power can then be determined in the forecast determination block 336 from said values, namely in the sense that said maximum regulatable power can be provided with a reliability of 99.98%. Such a calculation is made in each case for a period or a block of time of 4 hours. The result is then a maximum regulatable power $P_{neg.min}(t)$ that is dependent on the time, which corresponds to the reduction forecast power or is synonymous with the reduction forecast power. The maximum regulatable power in this case means that it is possible to perform regulation up to said value. The grid operator, who is supplied with said maximum regulatable power $P_{neg.min}(t)$, can thus in this case regulate or request regulation up to said value. On account of reliability considerations and, in particular, taking into account forecast uncertainties, this is, however, the minimum power that can be supplied. For example, with a better forecast or when a lower reliability is accepted, even more control power could thus be supplied.

Said maximum regulatable power $P_{neg.min}(t)$ is then fed to the supply block 338, which can then supply said control power to the grid operator or can market said power for grid support. In this respect, the supply block 338, which could also be referred to as marketing block, relates to the marketing of the negative control power.

Figure 4:
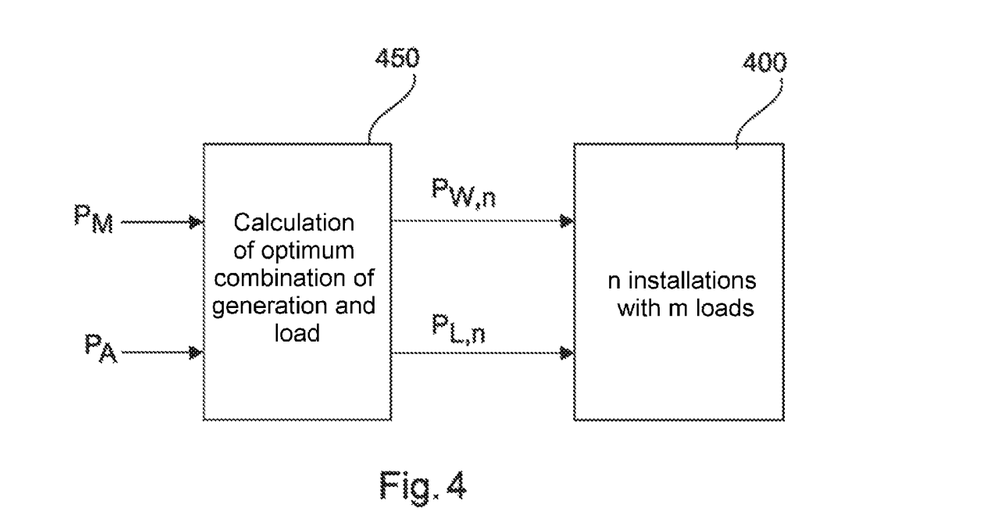
FIG. 4 shows a structure for controlling a wind farm for providing negative control power.

FIG. 4 explains how the fulfillment of a demanded negative control power is coordinated when such a negative control power is actually also demanded. The coordination block 450 is provided for this purpose. Said coordination block contains, as input variables, the power value $P_M$, which indicates how much power the wind farm generates and feeds in as a whole, and the value $P_A$, which indicates by how much power the wind farm is intended to be regulated, that is to say by how much less power the wind farm is intended to feed in. Both are values that relate in each case to the wind farm as a whole.

The coordination block 450 calculates therefrom, for each wind power installation, a power $P_{W,n}$ to be generated and fed in thereby and a power $P_{L,n}$ to be consumed through consumption at the respective installation. In this case, the coordination block 450 will preferably take into account an optimum combination between generated power and consumed power. These results, that is to say the power $P_{W,n}$ to be generated and fed in by each installation and the power $P_{L,n}$ to be consumed by each wind power installation, are then transmitted to the respective wind power installations 400 and only one wind power installation block 400 is shown as representative thereof. In actual fact, however, two variables are input into the coordination block 450 and said coordination block outputs 2·n variables again.

Figure 5:
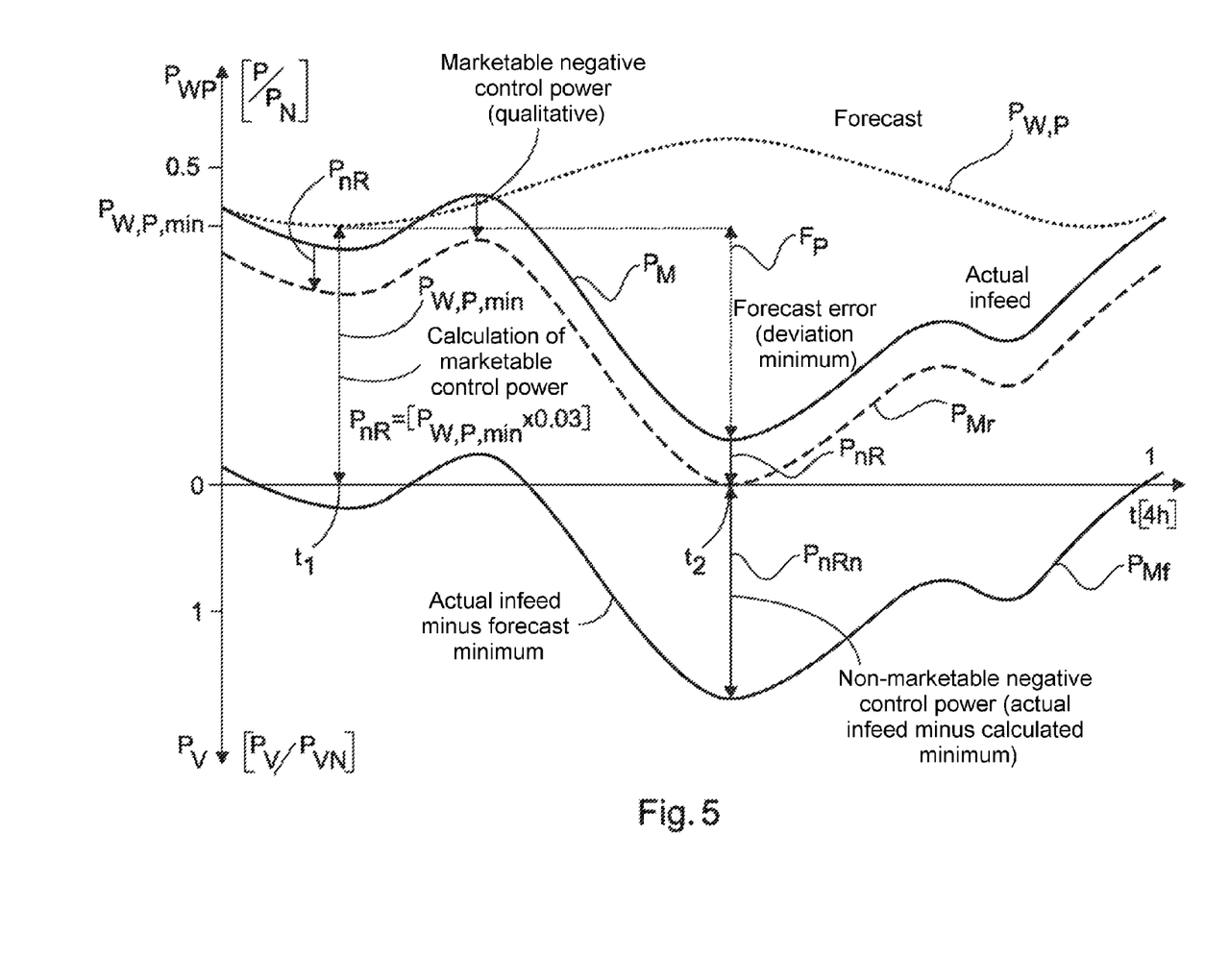
FIG. 5 shows a power/time graph for explaining possible, infed, available or supplied powers.
Figure 6:
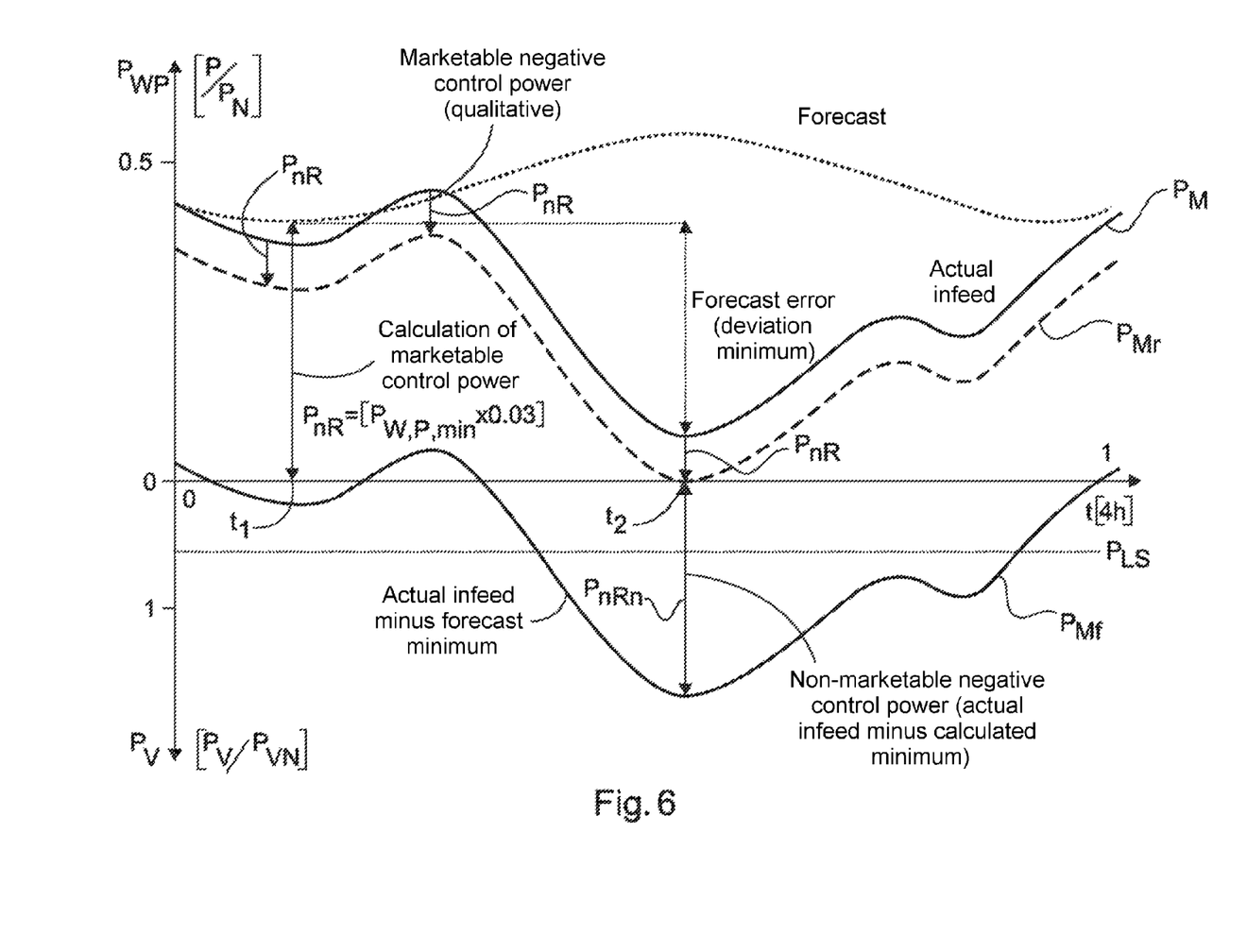
FIG. 6 shows a power/time graph similar to FIG. 5 but with variation thereof.
Figure 7:
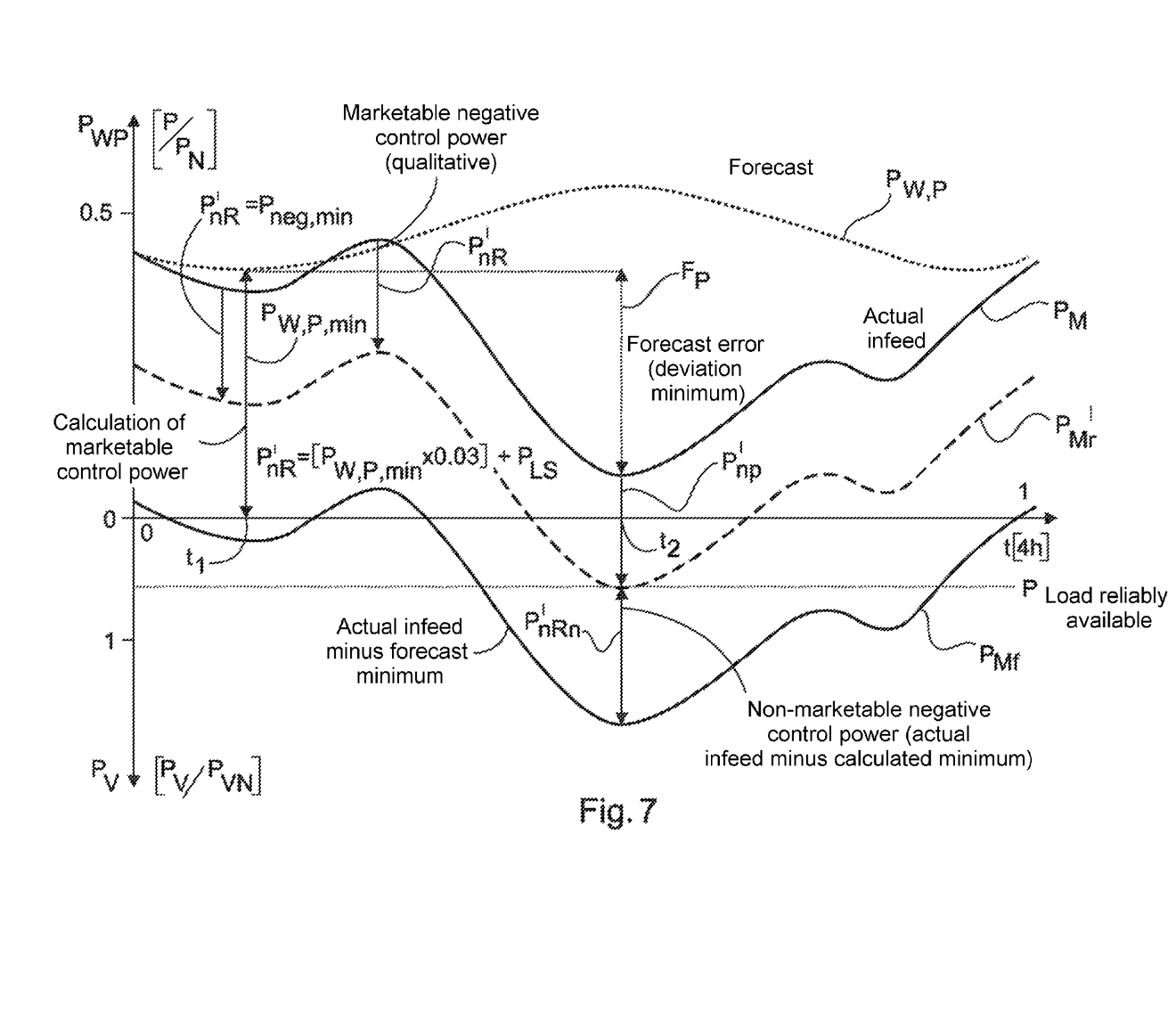
FIG. 7 shows a further power/time graph with a further explanatory variation with respect to FIGS. 5 and 6.

FIG. 5 shows a power/time graph, in which the power $P_{WP}$ that can be generated and fed in by the wind farm is illustrated as a function of the time. The graph shows in this respect the power $P_{WP}$ for the entire wind farm considered. On the ordinate, an available consumption power $P_V$ is also given as a negative branch, but which only becomes relevant in the modified graph of FIGS. 6 and 7. The present graph, the same applies to the graphs of FIGS. 6 and 7, shows a temporal section over four hours and hence over a period over which a negative control power could be supplied in principle. However, for a longer period, for example of 24 hours, a forecast and also a forecast power and a reduction forecast power can also be specified in principle. In this case, such a forecast period would, however, preferably be divided into a plurality of 4-hour sections. In the case of 24 hours, this range would thus be divided into six ranges for each four hours.

The present graph shows by way of the dotted curve a possibility for a forecast power $P_{W,P}$. Said forecast power $P_{W,P}$ depends on a weather prediction, in particular on a wind prediction. At the time $t_1$, the forecast power $P_{W,P}$ assumes a negative value, which is shown as $P_{W,P,min}$. The calculation of a marketable negative control power starts from said minimum value of the forecast power. Such a marketable negative control power $P_{nR}$ is calculated, for example, as 3% of the minimum forecast power $P_{W,P,min}$. The marketable negative control power therefore also corresponds to the reduction forecast power. For illustration, FIG. 5 then shows the power $P_M$ actually available for infeeding as a solid line. The marketable negative control power $P_{nR}$ is illustrated in this case as a shift, namely a decrease, in the actually available power $P_M$ with respect to the power $P_{Mr}$ that is infed in a reduced manner, illustrated in a dashed manner. Accordingly, the spacing of the actually available power $P_M$ from the power $P_{Mr}$ that is infed in a reduced manner in the case of a grid support demand is the marketable negative control power $P_{nR}$. In the example shown, said spacing should have 3% of the minimum forecast power $P_{W,P,min}$ and is illustrated in an enlarged manner in this and also the next illustration purely for the purpose of better illustration.

For illustration, FIG. 5 shows the special case that the actually available power $P_M$ at the time $t_2$ has dropped so low that it still only has the value of the marketable negative control power $P_{nR}$. In actual fact, said negative control power $P_{nR}$ is selected as the described 3% of the minimum forecast power $P_{W,P,min}$ in order to exclude, with a reliability of 99.98%, that the actually available power $P_M$ drops to a lower degree in a quarter-of-an-hour interval. Usually, the actually available power $P_M$ will drop so far only in 0.02% of the 15-minute intervals considered in the year and also the power $P_{Mr}$ that can be fed in in a reduced manner will come close to the zero line only in 0.02% of the quarter hours.

In any case, the spacing or the difference of said minimum value of the available power $P_M$ from the minimum forecast power $P_{W,P,min}$ is to be considered as the forecast error $F_P$. Because a great forecast error can arise, the marketable negative control power $P_{nR}$ is accordingly calculated conservatively. To this end, FIG. 5 is intended to illustrate that, despite such a non-forecast, severe drop in the actually available power $P_M$, the reduced power $P_{Mr}$ still does not become negative. This is the reason why the already explained conservative factor of 3% is often selected.

For illustration, a simulated power $P_{Mf}$ to be fed in is shown. Said simulated infeed power $P_{Mf}$ is a shift or decrease of the actually available power $P_M$ by the complete value of the minimum forecast power $P_{W,P,min}$. This illustrates the case when, for the same situation as marketable negative control power, the minimum forecast power $P_{W,P,min}$ had been used directly, that is to say not 3% thereof, but 100%. The reduced power that could be fed in would then, namely for the case when such a great control power were to be demanded, assume this value of the simulated infeed power $P_{Mf}$. It can easily be seen that in this case the power to be fed in in a reduced manner would become negative and therefore could not be realized through reduction of the infed power, because an infed power can be reduced only to the value of zero.

Accordingly, said negative power or the negative proportion of the power cannot be marketed and said value is shown, for illustration, with respect to the simulated infeed power $P_{Mf}$ as a spacing from the zero axis at the time $t_2$. Said non-marketable, negative control power is shown as $P_{nRn}$.

The invention has now recognized and proposed the consideration of consumption powers of consumers in the wind farm as well. Such a consumption power $P_{LS}$, which is reliably available, is shown in FIG. 6, which otherwise corresponds to FIG. 5. Said reliably available consumption power $P_{LS}$ is shown here as a horizontal line for the purpose of simplicity. In actual fact, however, the reliably available consumption power can also fluctuate, for reasons that have also already been explained above. However, the fluctuation in the reliably available consumption power $P_{LS}$ ought to be low in comparison with the forecast power $P_{W,P}$. As an alternative, a constant value can also be assumed for the reliably available consumption power $P_{LS}$, namely the smallest value in terms of magnitude for the 4-hour time period considered, when fluctuations are assumed.

FIG. 7 now explains how said reliably available consumption power can improve the marketable negative control power, namely increase said power in terms of magnitude. This is illustrated by the fact that the reduced instantaneous power $P_{Mr}$ that can be fed in can be shifted by said value of the reliably available consumption power $P_{LS}$, namely ultimately so that the thus changed, reduced power $P_{Mr}'$ that can be fed in affects the currently reliably available consumption power $P_{LS}$. This results in a significantly increased marketable negative control power $P_{nR}'$, which corresponds to the negative control power $P_{neg,min}(t)$ of the block diagram of FIG. 3. This is indicated in FIG. 7, but without the time dependency. The time dependency is to be understood as meaning, in particular, that said value can appear differently for different 4-hour time periods. However, FIG. 7 shows only one 4-hour section and, for this, said marketable negative control power $P_{neg,min}$ is set as a constant value.

As a result, the non-marketable, negative control power $P_{nRn}'$ is therefore also lower in terms of magnitude than for the case of FIG. 5.

It has been recognized that the actual infeed may turn out to be lower than the forecast infeed owing to forecast errors. The same applies for the available negative control power, because this is dependent on the infeed.

The proposed embodiments are particularly important so that such a wind farm is suitable for control power provision.

For a prequalification of power plants, including wind farms, for control power provision, the available and therefore spontaneously regulatable power must be proven. To this end, a reliability of 99% or even 99.98% is often required. It must thus be proven regularly with a reliability of 99% or 99.98% that the supplied control power can also be delivered. Such a control power can be supplied and compensated, wherein the compensation is determined by means of the supplied control power. It thus depends not on the requested power but on the supplied power.

With the present forecast quality, only approximately 3% of the forecast infeed power and control power can be supplied, which results from taking into account the probability of forecast errors.

It has been recognized that the amount of control power to be supplied can be significantly increased owing to the operation of internal consumers of a wind power installation or of the wind farm.

In one example, instead of −126 kW, which is calculated as 3% of a rated power, (−4200 kW*0.03) −892 kW can be supplied and therefore also marketed, when 766 kW through controllable consumers can also be taken into account (−4200 kW*0.03-766 kW).

To this end, it is proposed that a first technical device determines the minimum secured control power in the corresponding time slots taking into account the weather, the wind forecast and the loads.

A further technical device controls the individual installations and consumers in the wind farm to implement the control power demand. Owing to a method for combining discrete consumers and controllable infeed, it is possible to track the required load profile, that is to say to realize same.

The invention claimed is:

1. A method for operating a wind farm having one or more wind power installations for feeding electrical power into an electrical supply grid, the method comprising:
    feeding the electrical power into the electrical supply grid;
    identifying a forecast power describing an infed power that is configured to be fed in during a predetermined, future forecast period by the wind farm, the forecast power having a minimum value during the forecast period;
    determining a reduction forecast power denoting, for the forecast period, a power by which power fed in during the forecast period is configured to be reduced, the reduction forecast power being determined as a proportion of the minimum value of the forecast power during the forecast period;
    offering the reduction forecast power as a marketable negative control power to a grid operator, wherein the reduction forecast power is determined depending on the forecast power and depending on a controllable consumption power, wherein the controllable consumption power represents a power configured to be consumed on demand in the forecast period by a plurality of controllable consumers present in the wind farm; and
    in response to a request for grid support during the forecast period, reducing the infed power by a level up to the reduction forecast power.

2. The method as claimed in claim 1, wherein at least one of the plurality of controllable consumers is at least one of: switched on or a power consumption thereof is controlled so that the infed power is reduced as a result, wherein power is drawn from the electrical supply grid and is consumed when the infed power that has not yet been reduced is lower than the reduction forecast power and is lower than a demanded reduction power.

3. The method as claimed in claim 1, wherein determining the reduction forecast power includes adding a production power multiplied by a prescribable quality value and the controllable consumption power,
    wherein a forecast availability of the respective controllable consumers is taken into account to determine the controllable consumption power.

4. The method as claimed in claim 1, wherein:
    the controllable consumption power is made up of a plurality of power proportions,
    each of the plurality of power proportions is associated with a respective controllable consumer, and
    one or more of the plurality of power proportions is calculated from a maximum power of the respective controllable consumer multiplied by a forecast availability of the respective controllable consumer.

5. The method as claimed in claim 1, wherein the plurality of controllable consumers are actuated by a central farm control unit of the wind farm, wherein the central farm control unit receives a demand signal indicative of a demand for grid support from a grid control station, and wherein in response, in dependence on the demand, the central farm control unit reduces the infed power and actuates one or more of the plurality of controllable consumers.

6. The method as claimed in claim 1, wherein:
    at least one energy store is present in the wind farm to provide, at least temporarily, additional power to the electrical power generated by the wind farm for feeding into the electrical supply grid, and
    the reduction forecast power is determined depending on available power of the at least one energy store.

7. The method as claimed in claim 1, wherein the reduction forecast power is used as negative minutes control power.

8. The method as claimed in claim 1, wherein a central consumption control unit is provided to actuate or to coordinate the actuation of the plurality of controllable consumers, wherein the central consumption control unit is coupled to a central farm control unit and receives a total consumption setpoint value from the central farm control unit, the total consumption setpoint value indicating a value by which the consumption of the plurality of controllable consumers is configured to be reduced in all.

9. The method as claimed claim 1, wherein at least one of: the forecast power or the reduction forecast power is given as a time profile over the forecast period.

10. The method as claimed in claim 1, wherein the forecast period is 12 to 48 hours.

11. A wind farm comprising:
    a plurality of wind power installations configured to generate electrical power;
    an inverter configured to feed the electrical power into an electrical supply grid;

a controller configured to:
  identify a forecast power describing a power that is configured to be fed in during a predetermined, future forecast period by the wind farm, the forecast power having a minimum value during the forecast period;
  determine a reduction forecast power denoting, for the forecast period, a power by which the power fed in during the forecast period is configured to be reduced, the reduction forecast power being determined as a proportion of the minimum value of the forecast power during the forecast period;
  offer the reduction forecast power as a marketable negative control power to a grid operator; and
  in response to a request for grid support during the forecast period, cause infed power to be reduced by a level up to the reduction forecast power; and
at least one controllable consumer configured to consume power on demand,
wherein the controller is configured such that the reduction forecast power is determined depending on a controllable consumption power,
wherein the controllable consumption power represents a power is configured to be consumed on demand in the forecast period by the at least one controllable consumer.

12. A wind farm comprising circuitry configured to execute the method as claimed in claim 1.

13. The wind farm as claimed in claim 11, comprising a central consumption control unit configured to actuate or to coordinate actuation of the at least one controllable consumer, wherein the central consumption control unit is coupled to a central farm control unit and is configured to receive a total consumption setpoint value from the central farm control unit, the total consumption setpoint value indicating a value by which consumption of the at least one controllable consumer is configured to be reduced in all.

14. The wind farm as claimed in claim 11, wherein:
  the at least one controllable consumer is configured as an externally switchable consumer to be switched on by a control device in the wind farm for power consumption,
  the at least one controllable consumer is configured as a consumer whose power take-up can be controlled externally by the control device in the wind farm for the purpose of power consumption with an adjustable power level, and
  the control device is configured as a central farm control unit or as a consumption control unit.

15. The wind farm as claimed in claim 11, comprising at least one energy store configured to provide, at least temporarily, additional power to the electrical power generated by the plurality of wind power installations for feeding into the electrical supply grid, wherein the at least one energy store is prepared:
  to reduce the additional power on demand by the grid operator, and
  to provide information about at least one of: a state of charge of the at least one energy store or a prediction about power that is configured to be reduced in the forecast period.

16. A wind power installation for feeding electrical power into an electrical supply grid, the wind power installation comprising:
  an inverter for feeding the electrical power into the electrical supply grid;
  a controller configured to:
    identify a forecast power describing a power to be fed in during a predetermined, future forecast period by the wind power installation, the forecast power having a minimum value during the forecast period;
    determine a reduction forecast power denoting, for the forecast period, a power by which the power fed in during the forecast period is configured to be reduced, the reduction forecast power being determined as a proportion of the minimum value of the forecast power during the forecast period;
    offer the reduction forecast power as a marketable negative control power to a grid operator; and
    in response to a request for grid support during the forecast period, cause infed power to be reduced by a level up to the reduction forecast power; and
  at least one controllable consumer is configured to consume power on demand,
  wherein the controller is configured such that the reduction forecast power is determined depending on a controllable consumption power, and
  wherein the controllable consumption power represents a power configured to be consumed on demand in the forecast period by the at least one controllable consumer present in the wind power installation.

17. The method as claimed in claim 1, wherein the forecast period is divided into time periods.

18. The method as claimed in claim 17, wherein each of the time periods is 4 hours or 15 minutes.

\* \* \* \* \*